June 28, 1932.  W. HINES  1,864,730
LINE, COLUMN, AND WORD INDICATOR
Filed March 16, 1932   3 Sheets-Sheet 1
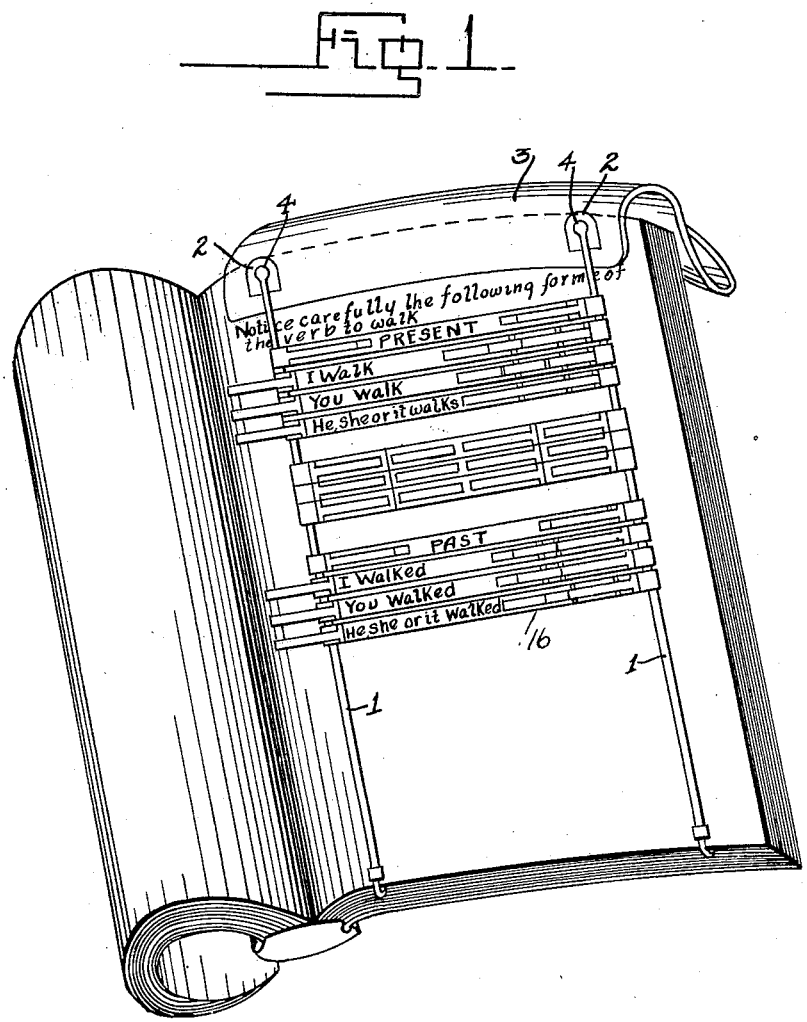
INVENTOR
William Hines
BY
ATTORNEY

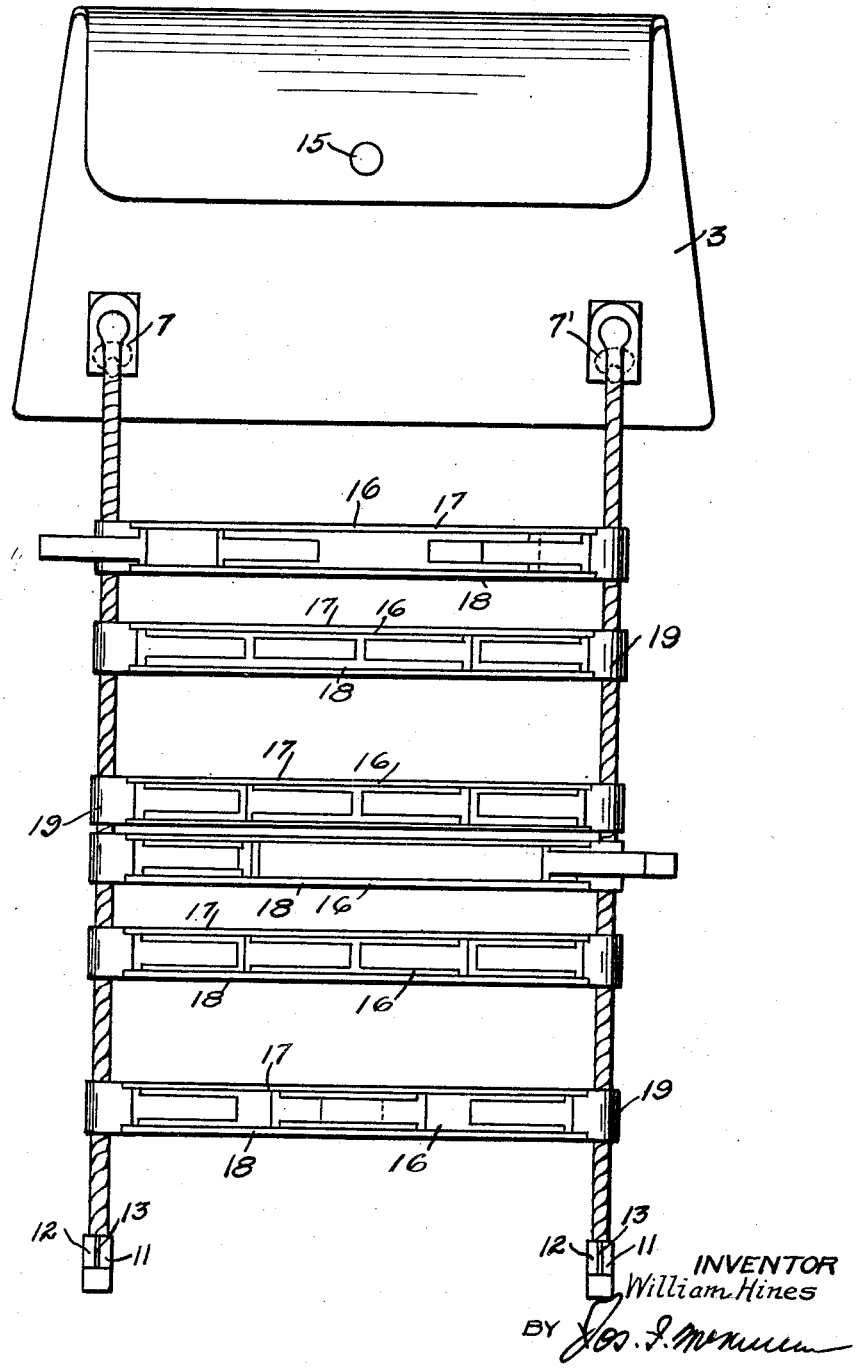

June 28, 1932.  W. HINES  1,864,730
LINE, COLUMN, AND WORD INDICATOR
Filed March 16, 1932   3 Sheets-Sheet 3
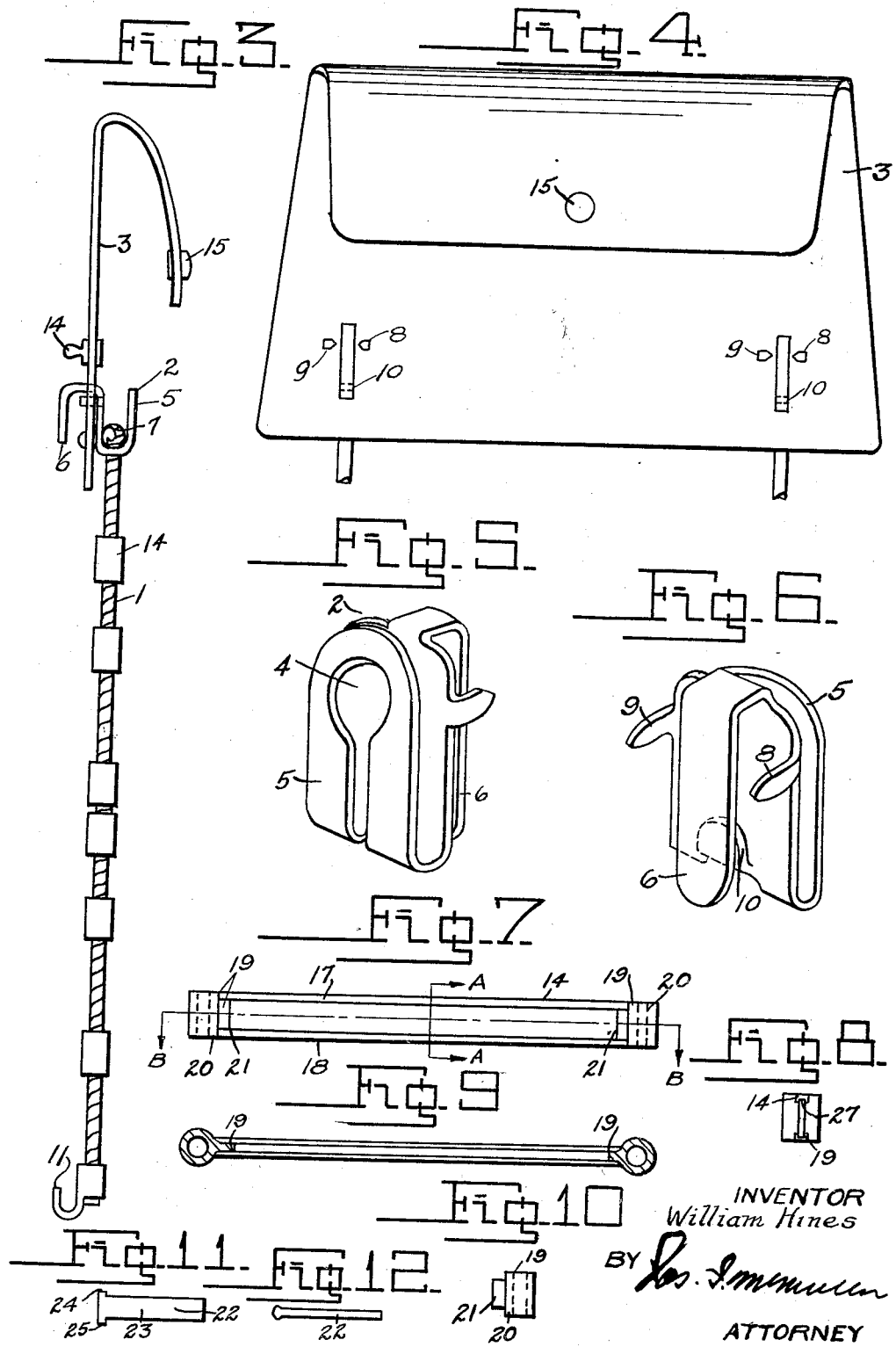

Patented June 28, 1932

1,864,730

UNITED STATES PATENT OFFICE

WILLIAM HINES, OF WASHINGTON, DISTRICT OF COLUMBIA

LINE, COLUMN, AND WORD INDICATOR

Application filed March 16, 1932. Serial No. 599,317.

(GRANTED UNDER THE ACT OF MARCH 3, 1883, AS AMENDED APRIL 30, 1928; 370 O. G. 757)

This invention described herein may be manufactured and used by or for the Government for governmental purposes, without the payment to me of any royalty thereon.

This invention relates to improvements in indicating devices for books, particularly to the type designed to direct the attention of the reader to portions of the reading matter which he desires to give special notice, to study, or to memorize.

One object of the invention is to provide a device which may be easily attached to the pages of a book to mark the page and to indicate to the reader any particular paragraph, line, word or column on that page which he desires to read.

Another object is to provide a device with which it is not only possible to indicate to the reader any particular paragraph, line, word or column, but may be so operated as to also exclude all other reading matter on the page, thereby completely isolating that which is of special importance.

Still another object of the invention is to provide a device of the nature set forth which may be economically constructed, is simple in operation and which may be compactly folded so that it may be easily carried in one's pocket.

Hitherto many book indicators have been devised for marking pages and lines, but a review of the art shows no device which is capable of indicating specific words, lines or columns on a sheet to the exclusion of other reading matter. It will be seen that this is of special benefit in studying languages where verbs are written in columns, since it will aid the student by enabling him to read only those verb forms which he is desirous of remembering and blocking out all other reading matter on the page.

Briefly stated, the device consists of a number of equally spaced transverse tracks slidably attached at either end to cords traversing a page of the book. A number of flaps are slidably and hingeably mounted between these equally spaced transverse tracks slidably attached at either end to cords traversing a page of the book. A number of flaps are slidably and hingeably mounted between these equally spaced transverse tracks so that any space on the printed sheet equal in area to that of a flap may be covered or uncovered thereby.

Referring more particularly to the accompanying drawings in which corresponding parts are indicated by similar reference characters:

Fig. 1 shows an open book with indicating device attached thereto with flaps either hingeably or slidably opened to allow the reader to study verb forms thereon;

Fig. 2 shows a front elevation of the device removed from the book;

Fig. 3 shows a side elevation of the same;

Fig. 4 shows a rear elevation of the upper portion of the device;

Figs. 5 and 6 show a front and rear perspective of the clamp used to attach the supporting cords to the upper supporting member;

Fig. 7 shows a front elevation of a sliding strip;

Fig. 8 shows a section of the sliding strip taken on the lines A—A of Fig. 7;

Fig. 9 shows a sectional view taken along the line B—B;

Fig. 10 is an end bearing of the sliding strip;

Fig. 11 is a front elevation of a flap or shutter of the sliding strip, and

Fig. 12 is an end elevation of the flap or shutter of the sliding strip.

Referring to Fig. 1, it will be noted that elastic cords (1) are attached to fastening devices or clamps (2), which in turn are mounted on a leather cover (3) as shown at the top of the page and also shown in detail in Fig. 4. These clamps shown in perspective in Figs. 5 and 6 are composed of an S-shaped strip of metal having a bayonet opening (4) in its front face (5) and a clamping strip (6) at the rear thereof. The bayonet opening provides an anchorage for the cords (1) which are either knotted or otherwise enlarged at their upper extremities (7) so that these enlarged portions will fit through the rounded portion of the bayonet opening and be clamped in the bottom of the slotted portion thereof. These clamps are attached to the leather cover (3) by the converging projections (8), (9) and (10) which are pushed through openings in the cover (3) and then bent down flat with the surface thereof. The lower portion of the cord is attached to the pages of the book by hooks (11) which are clamped to the lower ends of said cords by the encircling members (12) and (13) as shown in Figs. 1, 2 and 3.

The leather cover piece (3) to which the clamps (2) are attached, as shown in Fig. 4, is provided with a glove fastener composed of the interlocking members (14) and (15). When not in use the strips and cable may be folded up and the leather cover piece wrapped around the same and clamped with the glove fastener.

Bridging the space between the cords and attached at either end thereto are a number of frames (16) as shown in Figures 1, 2, 3, 7, 8 and 9. These frames are composed of upper and lower tracks (17) and (18) which are clamped or otherwise suitably attached to circular end members (19). The end members are preferably made with a short cylindrical portion (20) through which the cord (1) passes, said cylindrical portion having a radial projection (21) to which the tracks are clamped or otherwise suitably attached.

The tracks (17) and (18) are centrally grooved to form U-members as shown in Fig. 8, between which are slidably and rotatably fitted the shutters (22).

The shutters (22) as shown in Figures 11 and 12 are composed of a flat strip (23) having at one end a round circular mounting portion (24) with flat upper and lower bearing surfaces at (25) and (26) which lie against the inner surfaces (27) of the track members (17) and (18).

The mounting portion (24) thus provides a hingeable and slidable attaching member for the shutter so that the same may be slid along the track and opened and closed at any position thereon in order to either reveal or conceal any portion of the written matter on the page to which the device is attached.

In the operation of the device, after releasing the glove fastenings (14) and (15) and unfolding the cover, the rear members (6) of the upper clamps (2) are pressed over the top edge of several pages or the cover of a book. The hook (11) is likewise attached to the bottom of the pages or the cover. The frames (16) may then be slid up or down the cords (1) until they either conceal or reveal any desired printed matter on any particular line. If it is just a portion of the line which it is necessary to either cover or uncover the shutters may be slid along the tracks to the appropriate positions and they may then be either swung back or left closed as desired.

From the above description it will be easily seen that any portion of the written page to which the device is attached may be either hidden or disclosed to view.

Having described my invention, what I claim as new and wish to secure by Letters Patent is:

1. In a device of the character described, the combination of a pair of guide cords, upper and lower attaching means for said guide cords, a frame bridging said guide cords and slidably attached thereto, and a shutter hingeably and slidably mounted within said frame.

2. In a device of the character described, the combination of a pair of vertical guide cords, upper and lower attaching means for said guide cords, a longitudinal frame bridging said guide cords and slidably attached thereto, a shutter hingeably and slidably mounted within said frame.

3. In a device of the character described, the combination of a pair of vertical guide cords, upper and lower attaching means for said guide cords, a longitudinal frame bridging said guide cords and slidably attached thereto, a shutter hingeably and slidably mounted within said frame, and a flexible cover fastened to the aforesaid attaching means.

4. In a device of the character described, the combination of a pair of guide cords, attaching means at the extremities of said guide cords, a frame slidably attached at opposite ends to said guide cords, a shutter hingeably and slidably mounted within said frame.

5. In a device of the character described, the combination of a pair of guide cords, attaching means at the extremities thereof for attaching said flexible cover to an extremity of each of said cords, a frame slidably attached at opposite ends to said guide cords, a shutter hingeably and slidably mounted within said frame.

6. In a device of the character described, the combination of a pair of elastic guide cords, upper and lower attaching means for said guide cords, a series of frames composed of upper and lower grooved tracks, a series of shutters hingeably and slidably mounted between the aforesaid tracks, end members forming supports for said tracks, means for attaching said end members to said elastic guide cords, and a flexible cover fastened to the aforesaid attaching means.

7. In a device of the character described, the combination of a pair of elastic guide cords, upper and lower attaching means for said guide cords, a series of frames composed of upper and lower parallel grooved tracks, and a series of shutters hingeably and slidably mounted between the tracks, end members forming supports for said tracks, and means for slidably attaching the same to said guide cords, a flexible cover fastened to the aforesaid cord attaching means and a fastening means for retaining said cover in wrapped position.

8. In a device of the character described, the combination of a pair of elastic guide cords increased in diameter at one extremity thereof, a flexible cover, attaching means comprising an S shaped hook, one outer face which is formed with a bayonet opening through which the enlarged end of a cord is fitted, the other outer face formed to engage the edges of the leaves of a book, and the central portion of the S shaped hook formed with prongs which are clamped to the said flexible cover; attaching means fitted to the other end of said guide cords, a series of frames bridging said guide cords and slidably attached thereto, and a series of shutters hingeably and slidably mounted within said frames.

WILLIAM HINES.